(12) United States Patent
Mayer et al.

(10) Patent No.: US 11,027,343 B2
(45) Date of Patent: Jun. 8, 2021

(54) CUTTING TOOL

(71) Applicant: KOMET GROUP GMBH, Besigheim (DE)

(72) Inventors: Manuel Mayer, Illingen (DE); Niklas Kramer, Bietigheim-Bissingen (DE)

(73) Assignee: KOMET GROUP GMBH, Besigheim (DE)

( * ) Notice: Subject to any disclaimer, the term of this patent is extended or adjusted under 35 U.S.C. 154(b) by 33 days.

(21) Appl. No.: 16/135,336

(22) Filed: Sep. 19, 2018

(65) Prior Publication Data

US 2019/0015912 A1 Jan. 17, 2019

Related U.S. Application Data

(63) Continuation of application No. PCT/EP2017/056725, filed on Mar. 21, 2017.

(30) Foreign Application Priority Data

Mar. 21, 2016 (DE) ...................... 10 2016 105 210.8

(51) Int. Cl.
*B23C 5/28* (2006.01)
*B23D 77/00* (2006.01)
(Continued)

(52) U.S. Cl.
CPC .............. *B23C 5/28* (2013.01); *B23B 31/005* (2013.01); *B23D 77/006* (2013.01);
(Continued)

(58) Field of Classification Search
CPC ........... Y10T 407/14; Y10T 409/30952; Y10T 409/304032; Y10T 407/17–1745;
(Continued)

(56) References Cited

U.S. PATENT DOCUMENTS 5,290,135 A 3/1994 Ball et al.
5,586,476 A 12/1996 Esser
(Continued)

FOREIGN PATENT DOCUMENTS

CN 1120988 A 4/1996
CN 1196694 A 10/1998
(Continued)

OTHER PUBLICATIONS

"Power Skiving of Cylindrical Gears on Different Machine Platforms", by Dr. H.J. Stadtfeld, from journal "Gear Technology", pp. 52-62, the Jan./Feb. 2014 issue.*
(Continued)

*Primary Examiner* — Erica E Cadugan
(74) *Attorney, Agent, or Firm* — Bose McKinney & Evans LLP

(57) ABSTRACT

This disclosure relates to a cutting tool, having a main body, a cutting head, which is joined to the free end of the main body and is formed, by primary shaping, as a sintered piece provided with at least one cutting edge, and a cooling lubricant feed, which is led through the main body axially and which has a cooling lubricant distributor inserted into the cutting head for redirecting cooling lubricant into the region of the at least one cutting edge. According to this disclosure, a plurality of protruding spacers for keeping a gap clear with respect to the cooling lubricant distributor and/or the main body are sintered on a supporting surface of the cutting head as primary shaped elements.

17 Claims, 4 Drawing Sheets

(51) Int. Cl.
*B23B 31/00* (2006.01)
*B23B 27/12* (2006.01)

(52) U.S. Cl.
CPC ...... *B23C 2210/02* (2013.01); *B23C 2210/03* (2013.01); *B23C 2240/08* (2013.01); *B23D 2277/02* (2013.01); *B23D 2277/061* (2013.01); *Y10T 409/30952* (2015.01); *Y10T 409/304032* (2015.01)

(58) Field of Classification Search
CPC ......... Y10T 409/105565; Y10T 407/26; B23C 5/28; B23C 2240/08; B23C 2240/16; B23D 77/006; B23D 2277/061; B23F 5/163; B23B 2240/08–16; B23B 2231/2051; B23B 27/18–20
USPC ......... 407/11, 20–29, 118; 409/234, 136, 36
See application file for complete search history.

(56) References Cited

U.S. PATENT DOCUMENTS

| | | | |
|---|---|---|---|
| 6,053,672 A | | 4/2000 | Satran et al. |
| 6,450,738 B1 * | | 9/2002 | Ripley ...................... B23C 5/28 |
| | | | 407/35 |
| 8,858,125 B2 | | 10/2014 | Pilkington |
| 10,137,549 B2 * | | 11/2018 | Koik .................. B23Q 11/1046 |
| 2007/0104549 A1 | | 5/2007 | Hecht et al. |
| 2009/0053001 A1 | | 2/2009 | Cohen |
| 2009/0283975 A1 | | 11/2009 | Kretzschmann et al. |
| 2015/0078851 A1 | | 3/2015 | Liepelt et al. |
| 2015/0314382 A1 * | | 11/2015 | Sobczyk ................. B23F 21/00 |
| | | | 407/23 |

FOREIGN PATENT DOCUMENTS

| | | | |
|---|---|---|---|
| DE | 4033607 A1 * | 4/1992 | |
| DE | 10 2006 028 373 A1 | 12/2007 | |
| DE | 10 2011 050 176 A1 | 11/2012 | |
| DE | 102012022439 A1 * | 5/2014 | |
| DE | 10 2013 015 252 A1 | 3/2015 | |
| DE | 202015106360 U1 * | 1/2016 | |
| EP | 2 520 396 A1 | 11/2012 | |
| FR | 2333602 A * | 8/1977 | |
| KR | 100253062 B1 | 4/2000 | |
| WO | WO 2015/055364 A1 | 4/2015 | |

OTHER PUBLICATIONS

Machine Translation of DE 4033607 A1, which DE '607 was published Apr. 1992.*
Machine Translation of DE 202015106360 U1, which DE '360 was published Jan. 2016.*
International Search Report, PCT/EP2017/056725, dated Jun. 22, 2017, 3 pages.
English translation of the International Preliminary Report on Patentability and Written Opinion of the International Searching Authority, PCT/EP2017/056725, dated Sep. 25, 2018, 7 pages.

* cited by examiner

Spacers Arranged at an Irregular Angular Distance from One Another, as Viewed Around the Longitudinal Central Axis in the Peripheral Direction

Fig. 4

Spacers Having a Conical, Wedge, Arched, or Prismatic Shape

Fig. 5

CUTTING TOOL

RELATED APPLICATIONS

This application is a continuation of PCT/EP2017/056725, filed Mar. 21, 2017, which claims priority to DE 10 2016 105 210.8, filed Mar. 21, 2016, both of which are hereby incorporated herein by reference in their entirety.

BACKGROUND

This disclosure relates to a cutting tool, in particular a reaming tool for machining a hole or a milling tool, comprising a main body, which has a longitudinal central axis and can be clamped in a tool holder, a cutting head, which is joined to the free (front) end of the main body and is formed, by primary shaping, as a sintered piece provided with at least one cutting edge, and a cooling lubricant feed, which is led through the main body axially and which has a cooling lubricant distributor inserted into the cutting head for redirecting cooling lubricant into the region of the at least one cutting edge.

Reaming is a cutting machining method by means of a geometrically defined cutting edge. Only small machining cross sections are used in pre-machined holes, in contrast to solid drilling or boring. The machining or reaming allowances to be machined are typically in the range of 0.1 to 0.5 mm in diameter. A reaming tool should ensure a high hole quality across a large number of components, with the lowest possible tolerances in the diameter and in the shape and position of the hole and the roughness thereof. In this context, it is known from WO 2015/055364 to fasten a cutting head to a main body by means of a non-detachable soldered connection. The cutting edges are then ground to the desired size in a following production step. In order to redirect the coolant into the region of the cutting edges, a distributor is inserted into a coolant channel of the cutting head and is fastened by a clamping screw screwed into the front shaft portion of the main body. In this configuration, various tolerances for the gap size of the cooling lubricant passage below the distributor are significant, in particular, the thickness of the soldered joint, the height of the cutting head, the ridge width of the distributor and the position of the inner thread in the main body. As a result, in some circumstances, the coolant distributor gap does not have the required dimension in order to ensure sufficient supply in the region of the cutting edges.

In order to increase the performance of reaming tools, it has proven effective to form the cutting head as a sintered blank made of hard metal, which can be reworked to a certain extent by rotational machining and sharpening. However, it is not possible to drill the coolant channels in this case.

This disclosure teaches an improvement to the tools known from the prior art and to ensure exact positioning of components to be joined and the cooling lubricant supply with low production costs.

This disclosure is based on the concept of producing the shaping elements for a defined spacing, in the case of a sintered cutting head, directly in the first primary shaping process. Correspondingly, it is proposed according to this disclosure that a plurality of protruding spacers for keeping a gap clear with respect to the cooling lubricant distributor and/or the main body are sintered on a supporting or guide surface of the cutting head as primary shaped elements. It is therefore possible to produce suitable spaces in an integrated shaping process without the need for additional aids having tolerances, without reworking being necessary. In addition, a required spacing for producing a gap can therefore be defined exactly at the location at which said spacing is to be maintained, in particular in order to convey cooling lubricant effectively and/or to produce a soldered connection. The manufacturing costs of producing the press mold are largely unaffected by the number of pieces and is not influenced significantly by the additional spacers. Another advantage is that the rest of the tool parts can be produced with less outlay, as avoiding spacing linkages means that extreme tolerances do not have to be maintained.

Advantageously, the cooling lubricant distributor is held so as to be positioned on the spacers, so that the gap, defined by the spacers, between the supporting surface and the cooling lubricant distributor for conveying cooling lubricant remains clear.

In another particularly preferred embodiment, the cooling lubricant distributor is clampingly fastened to the spacers by means of a screw connection without a fixed connection to the main body. In this way, the required spacing is set directly on the cutting head, without the need for expensive mechanical constructions on the main body. Smaller installation spaces and/or head diameters can therefore be implemented.

A particularly simple improvement can be implemented by the cooling lubricant distributor being screwed into a centering sleeve that is movable against an abutment of the cutting head.

In another design improvement, the centering sleeve is guided in an axial hole of the main body and is provided, as part of the cooling lubricant feed, with passage openings for cooling lubricant.

In order to prevent interfering contours, in particular for machining blind holes, it is advantageous if the guide surface is axially set back towards the main body with respect to a front end part of the cutting head, the cooling lubricant distributor being mounted inside the cutting head.

In order to apply cooling lubricant to the cutting edges in a targeted manner, it is advantageous if the cutting head is provided with recesses that are associated with one cutting edge in each case and form a radial passage for the cooling lubricant in the region of a flute connected to the cutting edge.

The cooling lubricant can be radially redirected in the region of the cutting head due to the cooling lubricant distributor being formed as a fungiform rotary part made of metal, in particular steel.

Another advantageous design consists in the spacer protruding on a side of the cutting head facing the main body, the gap between the supporting surface and the main body kept clear by the spacers forming a solder gap for a soldered connection of the cutting head to the main body.

In order to ensure tilt-free centering, it is advantageous if at least three spacers are distributed around the longitudinal central axis in the peripheral direction.

Depending on the tool configuration, it may be advantageous for an unimpeded flow of cooling lubricant if the spacers are arranged at the same or at an irregular angular distance from one another as seen around the longitudinal central axis in the peripheral direction.

In order to define suitable gap sizes, it is advantageous if the spacers have a height in the range of 0.1 to 2 mm, preferably 0.2 to 1 mm.

Functional and production-related advantages can be achieved by the spacers being formed as in particular spherical, conical, wedge-shaped, arched or prismatic geometric shaped bodies that extend from the free support point facing away from the guide surface.

Another variant of this disclosure consists of at least one depression being formed in a supporting surface of the cutting head, the depression delimiting a passage for cooling lubricant with respect to the cooling lubricant distributor positioned on the supporting surface.

Other variants of this disclosure include a cutting tool in which the plurality of spacers comprises at least three spacers distributed around the longitudinal central axis in a peripheral direction. Another variant includes a cutting tool wherein the spacers are arranged at the same angular distance or at an irregular angular distance from one another, as viewed around the longitudinal central axis in the peripheral direction. Another variant includes a cutting tool wherein the spacers have a height in the range of 0.1 to 2 mm. Another variant includes a cutting tool in which the spacers have a height in the range of 0.2 to 1 mm. Yet another variant includes a cutting in which the spacers have spherical, conical, wedge, arched or prismatic shape. In another variant, the spacers are spaced radially inwardly from the at least one cutting edge.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 4 schematically depicts a further variant; and

FIG. 5 schematically depicts further variants.

DESCRIPTION

Figure 1:
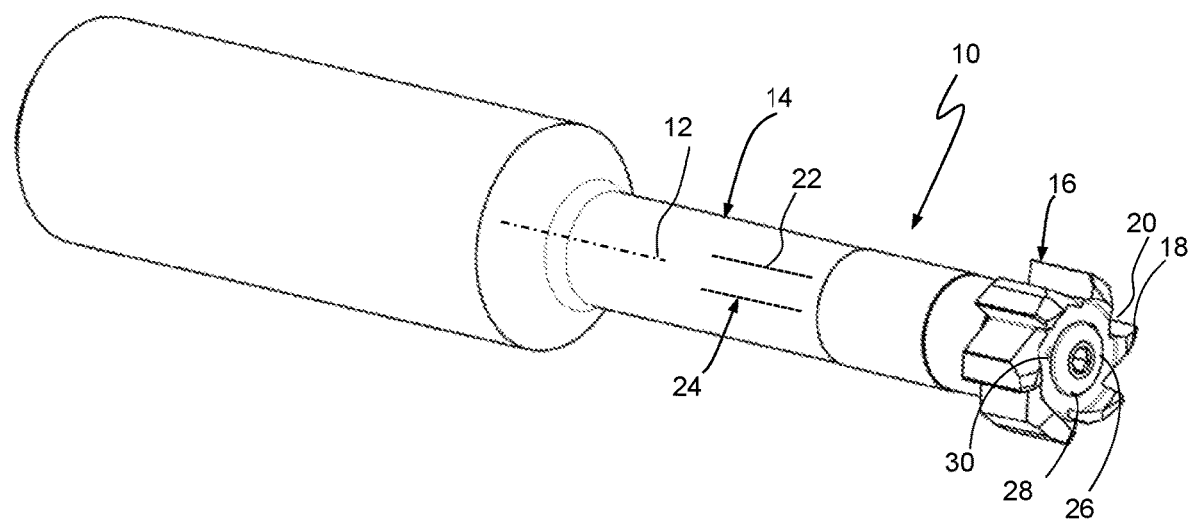
FIG. 1 is a perspective view of a reaming tool having a sintered cutting head and a cooling lubricant distributor inserted therein.

The embodiments described below are not intended to be exhaustive or to limit the invention to the precise forms disclosed in the following description. Rather, the embodiments are chosen and described so that others skilled in the art may appreciate and understand the principles and practices of this disclosure.

It shall be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "cutting edge," "spacer," "depression," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

The reaming tools 10 shown in the drawings can be rotatably driven about their tool axis or longitudinal central axis 12 by means of a tool machine in order to finish a pre-machined hole in a workpiece, and are axially displaced in the process in order to remove additional friction by cutting and thus to produce an accurately fitting hole having high surface quality. However, the tool axis may also be an axis of rotation for a workpiece that is rotated about the tool axis by means of a stationary machine tool for the purpose of machining.

As shown in FIG. 1, the reaming tool 10 has a tiered cylindrical main body 14, which can be clamped in the tool holder of a machine at the rear end thereof and which has a cutting head 16 at the front end thereof. The cutting head 16 is formed as a sintered pressed piece made of hard metal or cermet and is provided with a plurality of sharpened cutting edges 18 which are distributed over the periphery of the cutting head and to each of which a flute 20 is allocated. A channel 22 extends through the main body 14 in the longitudinal direction thereof as part of a cooling lubricant feed 24 that is supplied on the machine side and that comprises, on the outlet side, a cooling lubricant distributor 26 inserted into the cutting head 16 for radially redirecting cooling lubricant into the region of the cutting edges 18 and flutes 20. In order to keep a defined passage gap between the main body 14 and the cooling lubricant distributor 26 free, a plurality of raised protruding spacers 30 are arranged on a guide or supporting surface 28 of the cutting head 16, which spacers have been formed as primary shaped elements during sintering.

Figure 2:
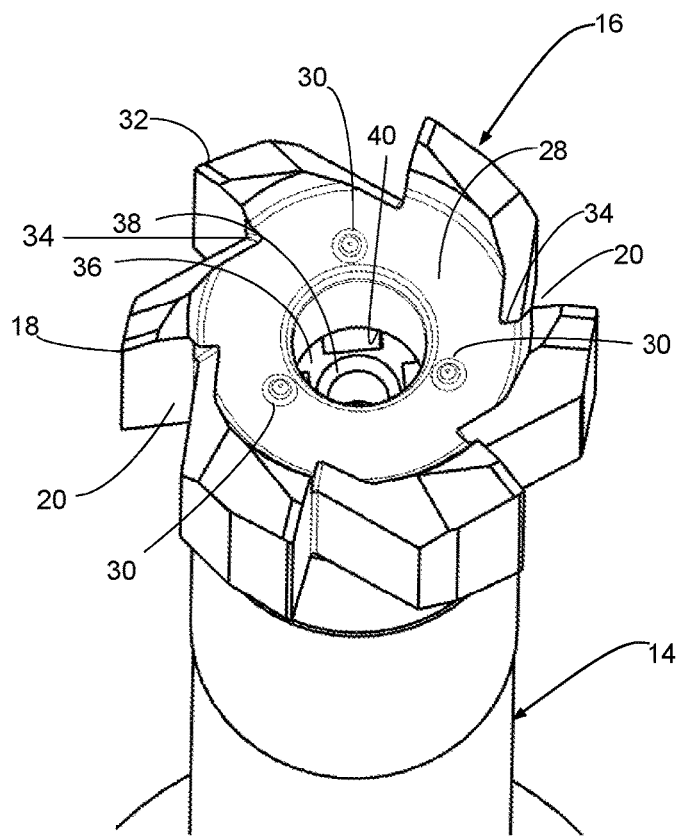
FIG. 2 is an enlarged view of the cutting head without the cooling lubricant distributor.

As can be seen in FIG. 2, the supporting surface 28 is formed by a ring surface that faces forward axially and is set back with respect to a front end part 32 of the cutting head 16, so that the cooling lubricant distributor 26 can be received in the cutting head 16 without axial projection. In order to convey the cooling lubricant away from the supporting surface 28 into the region of the cutting edges 18 in a targeted manner, the cutting head 16 is provided with a plurality of recesses 34 that each open into a flute 20. The recesses 34 are produced, after the cutting head 16 is sintered, when said cutting head is notched, which permits flexible allocation depending on the number of ground cutting edges 18.

In the embodiment shown, three spacers 30 are distributed around the longitudinal central axis 12 in the peripheral direction. Expediently, the spacers 30 have a height in the range of 0.2 to 1 mm. In this case, the spacers 30 have a geometric shape, for example spherical, that extends towards the support point thereof.

In principle, it is also possible that the distance or angular distance of the spacers 30 from one another is adapted to the number of cutting edges 18. Depending on the configuration of the cutting edges 18, it is also conceivable that the spacers 30 are distributed irregularly (as schematically depicted in FIG. 4), so that the flow of the coolant radially to the cutting edges 18 (the number of which may vary, depending on use, when other tool dimensions remain the same) is not impeded.

A centering sleeve 36 is provided for securing the cooling lubricant distributor 26, which sleeve is mounted in the main body 14 so as to have limited axial movement. The centering sleeve 36 has an inner thread 38 and is provided on the outside with axial grooves 40 for conveying cooling lubricant.

Figure 3:
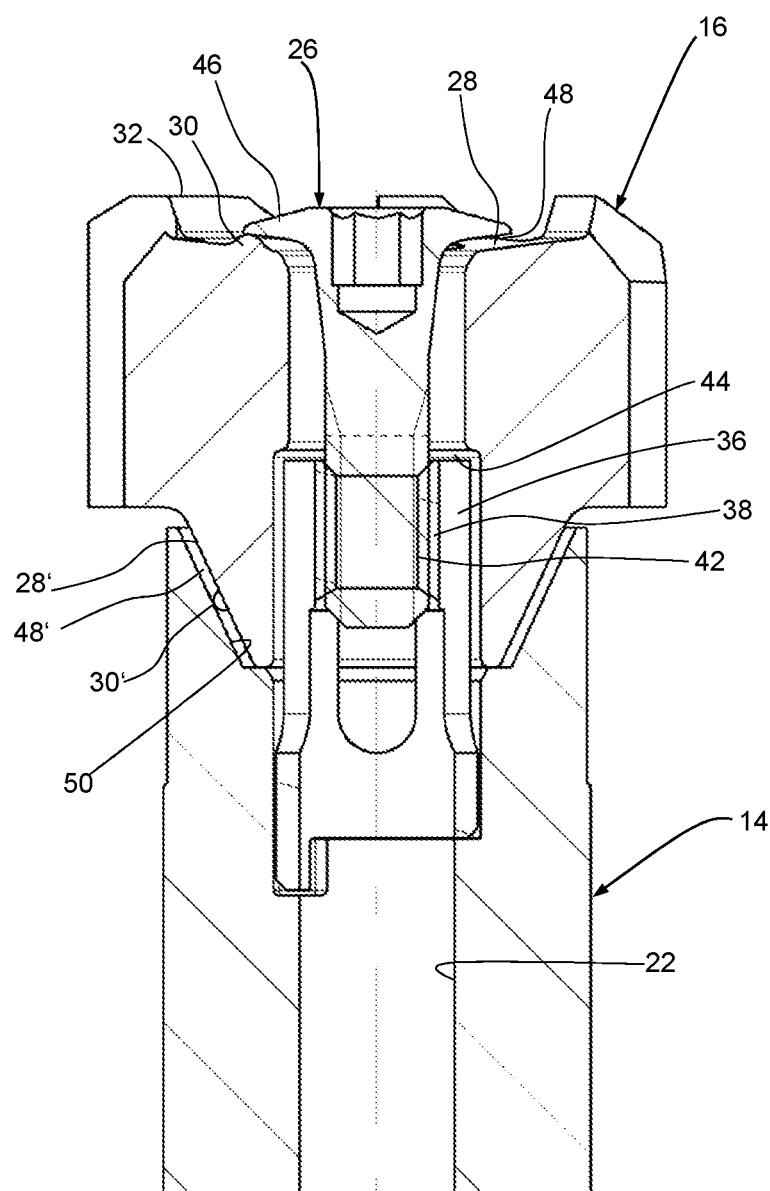
FIG. 3 is an incomplete axial section through the reaming tool according to FIG. 1.

As can be seen most clearly in FIG. 3, the fungiform cooling lubricant distributor 26 can be screwed into the inner thread 38 of the centering sleeve 36 by means of a threaded extension 42. In this case, the centering sleeve 36 is pulled against an axial shoulder 44 of the cutting head 16, while the radially protruding head piece 46 of the cooling lubricant distributor 26 is securely positioned on the spacers 30. The clamping connection is therefore implemented without fixed connection to the main body 14. As a result, a defined gap 48 of the cooling lubricant passage between the supporting surface 28 of the sintered cutting head 16 and the head piece 46 of the cooling lubricant distributor 26 produced as a rotary part made of metal is kept free, without connection tolerances to the main body 14 being significant.

In principle, it is also possible that spacers 30' can be sintered to a supporting surface of the cutting head 16 that faces the main body 14, in order to ensure a defined gap size. For example, the spacers 30' can protrude from a rear tapered surface 28' of the cutting body 16, in order to keep a solder gap 48' clear for a soldered connection, with respect to a front conical surface 50 of the main body 14.

It is also conceivable that suitable depressions are formed in the supporting surface 28 of the cutting head 16 instead of raised spacers 30, in order to thereby produce a radial passage for cooling lubricant. In this case, the head piece 46 of the cooling lubricant distributor 26 may be positioned directly on the supporting surface 28.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A cutting tool, comprising:
a main body having a longitudinal central axis and configured to be clamped in a tool holder;
a sintered cutting head joined to a free end of the main body, the cutting head having at least one cutting edge and a cooling lubricant feed which is led through the main body axially;
a cooling lubricant distributor inserted into the cutting head and configured for redirecting cooling lubricant into a region of the at least one cutting edge; and
a plurality of primary shaped protruding spacers sintered on the cutting head, wherein the cutting head forms an annular gap separating the spacers from the at least one cutting edge, the spacers configured to maintain a gap between the cutting head and the distributor for flow of the cooling lubricant.

2. The cutting tool according to claim 1, wherein the cooling lubricant distributor is positioned on the spacers.

3. The cutting tool according to claim 1, wherein the cooling lubricant distributor is pressed against the spacers.

4. The cutting tool according to claim 1, wherein the cooling lubricant distributor is screwed into a centering sleeve that is movable against an abutment of the cutting head.

5. The cutting tool according to claim 4, wherein the centering sleeve is fitted into an axial hole of the main body and has openings for cooling lubricant.

6. The cutting tool according to claim 1, wherein the protruding spacers are sintered on a supporting surface of the cutting head and the supporting surface is set back axially toward the main body relative to a front end part of the cutting head, the cooling lubricant distributor being mounted inside the cutting head.

7. The cutting tool according to claim 1, wherein the cutting head has a recess associated with one of the at least one cutting edges, the recess forming a radial passage for the cooling lubricant in the region of a flute connected to the one of the at least one cutting edges.

8. The tool according to claim 1, wherein the cooling lubricant distributor comprises a fungiform rotary part made of metal.

9. The tool according to claim 8, wherein the cooling lubricant distributor is made of steel.

10. The cutting tool according to claim 1, wherein the plurality of spacers comprises at least three spacers distributed around the longitudinal central axis in a peripheral direction.

11. The cutting tool according to claim 1, wherein the spacers are arranged at the same angular distance or at an irregular angular distance from one another, as viewed around the longitudinal central axis in the peripheral direction.

12. The cutting tool according to claim 1, wherein the spacers have a height in the range of 0.1 to 2 mm.

13. The cutting tool according to claim 12, wherein the spacers have a height in the range of 0.2 to 1 mm.

14. The cutting tool according to claim 1, wherein the spacers have a spherical, conical, wedge, arched or prismatic shape.

15. The cutting tool of claim 1, wherein the spacers are spaced radially inwardly from the at least one cutting edge.

16. A cutting tool, comprising:
a main body having a longitudinal central axis and configured to be clamped in a tool holder;
a sintered cutting head joined to a free end of the main body, the cutting head having at least one cutting edge and a cooling lubricant feed which is led through the main body axially;
a cooling lubricant distributor inserted into the cutting head and configured for redirecting cooling lubricant into a region of the at least one cutting edge; and
a plurality of primary shaped protruding spacers sintered on a supporting surface of the cutting head, the spacers configured to maintain a gap for flow of the cooling lubricant, which gap is between the supporting surface and the cooling lubricant distributor; and
wherein the cooling lubricant distributor is screwed into a centering sleeve that is movable against an abutment of the cutting head.

17. A cutting tool, comprising:
a main body having a longitudinal central axis and configured to be clamped in a tool holder;
a sintered cutting head joined to a free end of the main body, the cutting head having at least one cutting edge and a cooling lubricant feed which is led through the main body axially;
a cooling lubricant distributor inserted into the cutting head and configured for redirecting cooling lubricant into a region of the at least one cutting edge; and
a plurality of primary shaped protruding spacers sintered on the cutting head and spaced from the region of the at least one cutting edge, the spacers configured to maintain a gap between the cutting head and the main body, wherein the gap is configured for a soldered connection between the cutting head and the main body.

* * * * *